(No Model.) 7 Sheets—Sheet 2.
C. B. WITHINGTON.
GRAIN BINDER.
No. 422,103. Patented Feb. 25, 1890.
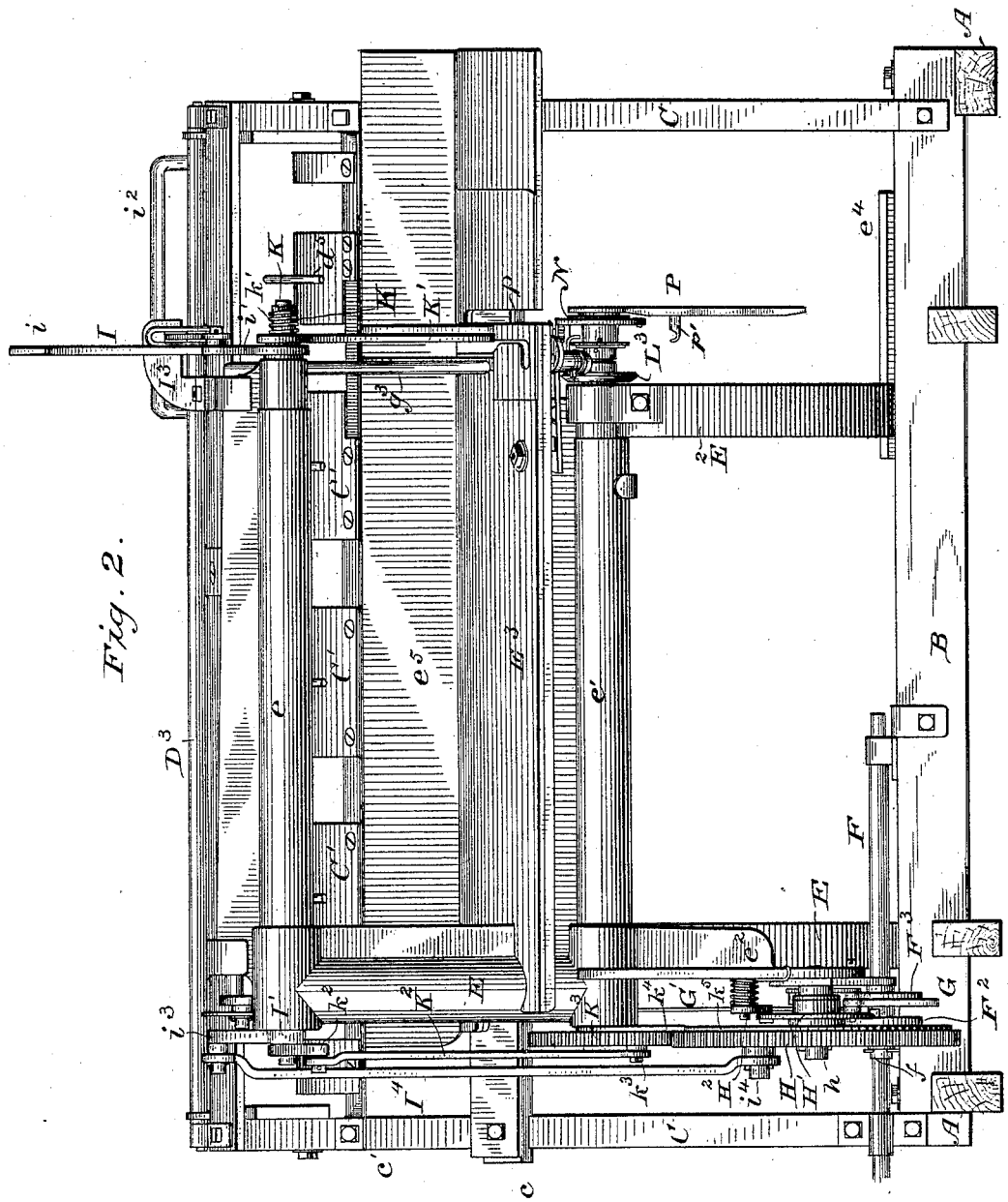
Witnesses
Wm. A. Skinkle
Henry A. Lamb
Inventor
Charles B Withington
By his Attorneys

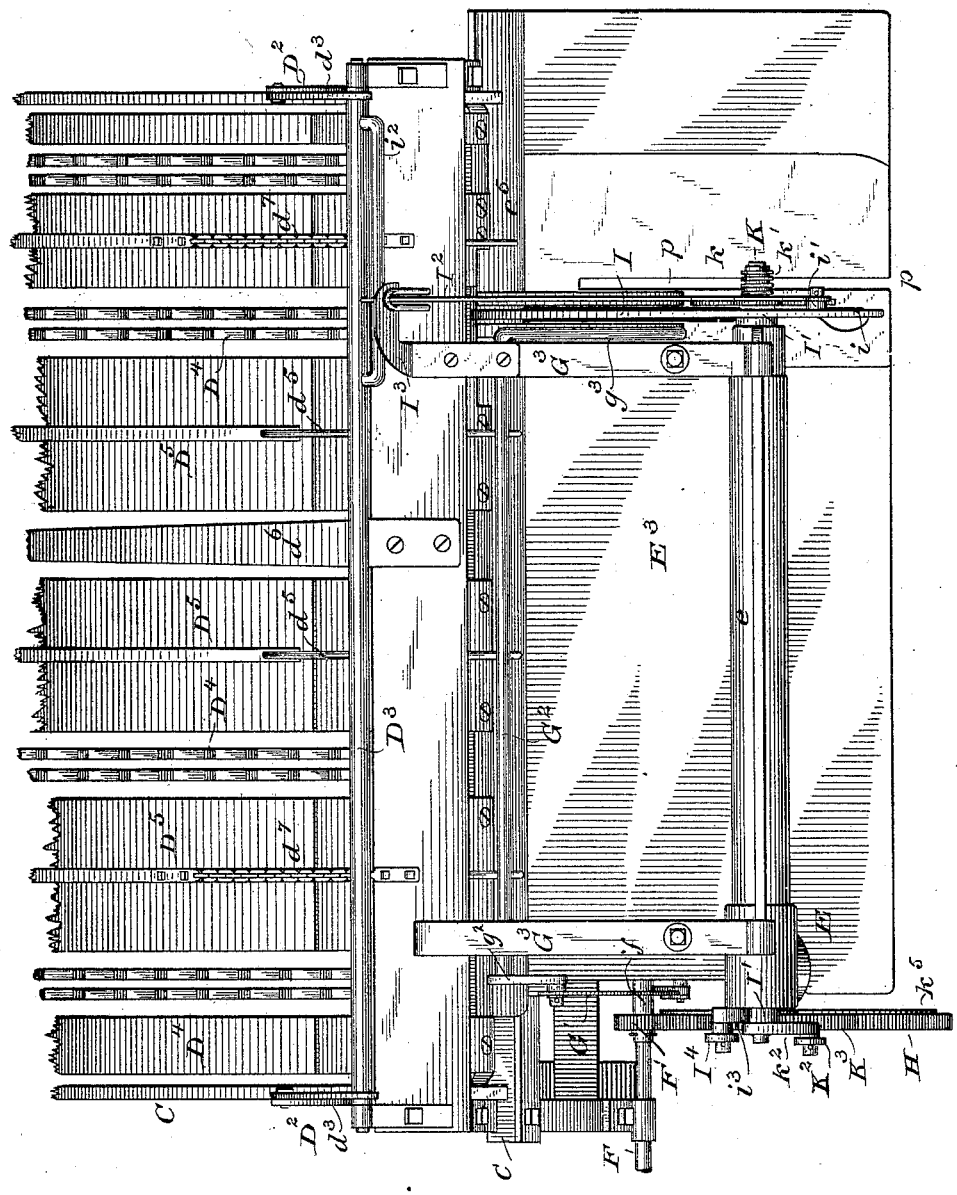

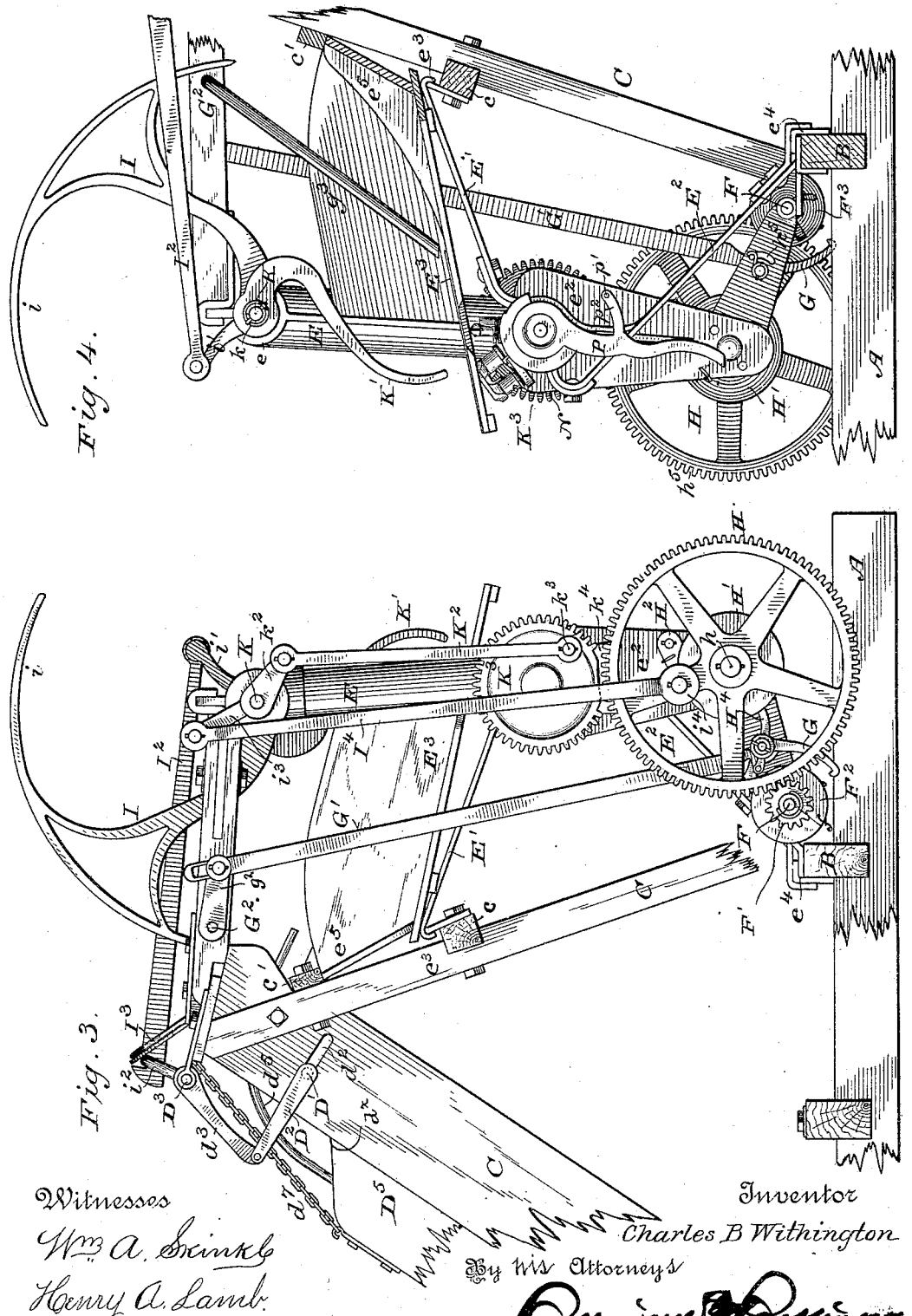

(No Model.) 7 Sheets—Sheet 4.
C. B. WITHINGTON.
GRAIN BINDER.
No. 422,103. Patented Feb. 25, 1890.
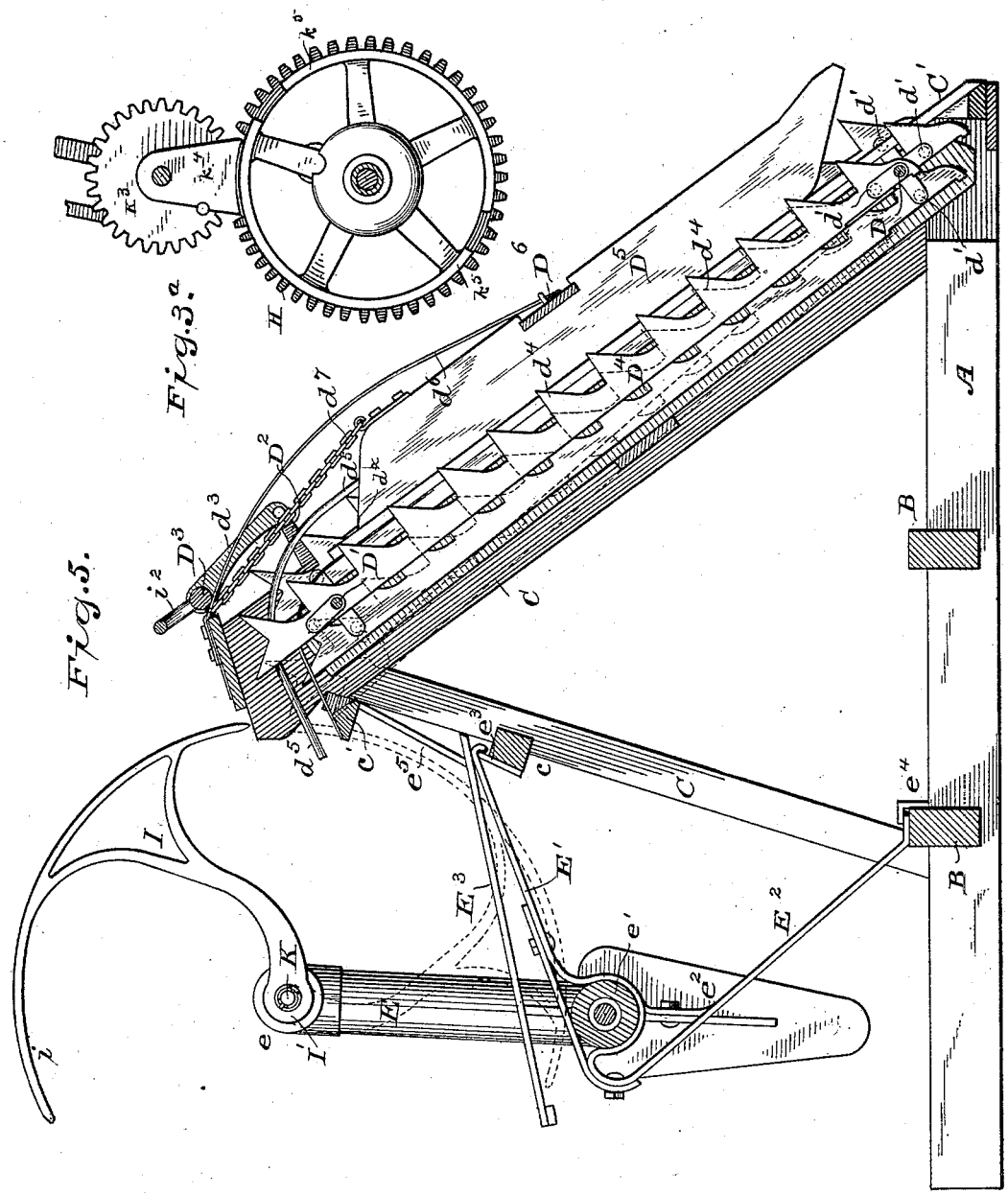
Witnesses
Wm A. Skinkle
Henry A. Lamb
Inventor
Charles B Withington
By his Attorneys (No Model.) 7 Sheets—Sheet 5.
C. B. WITHINGTON.
GRAIN BINDER.
No. 422,103. Patented Feb. 25, 1890.
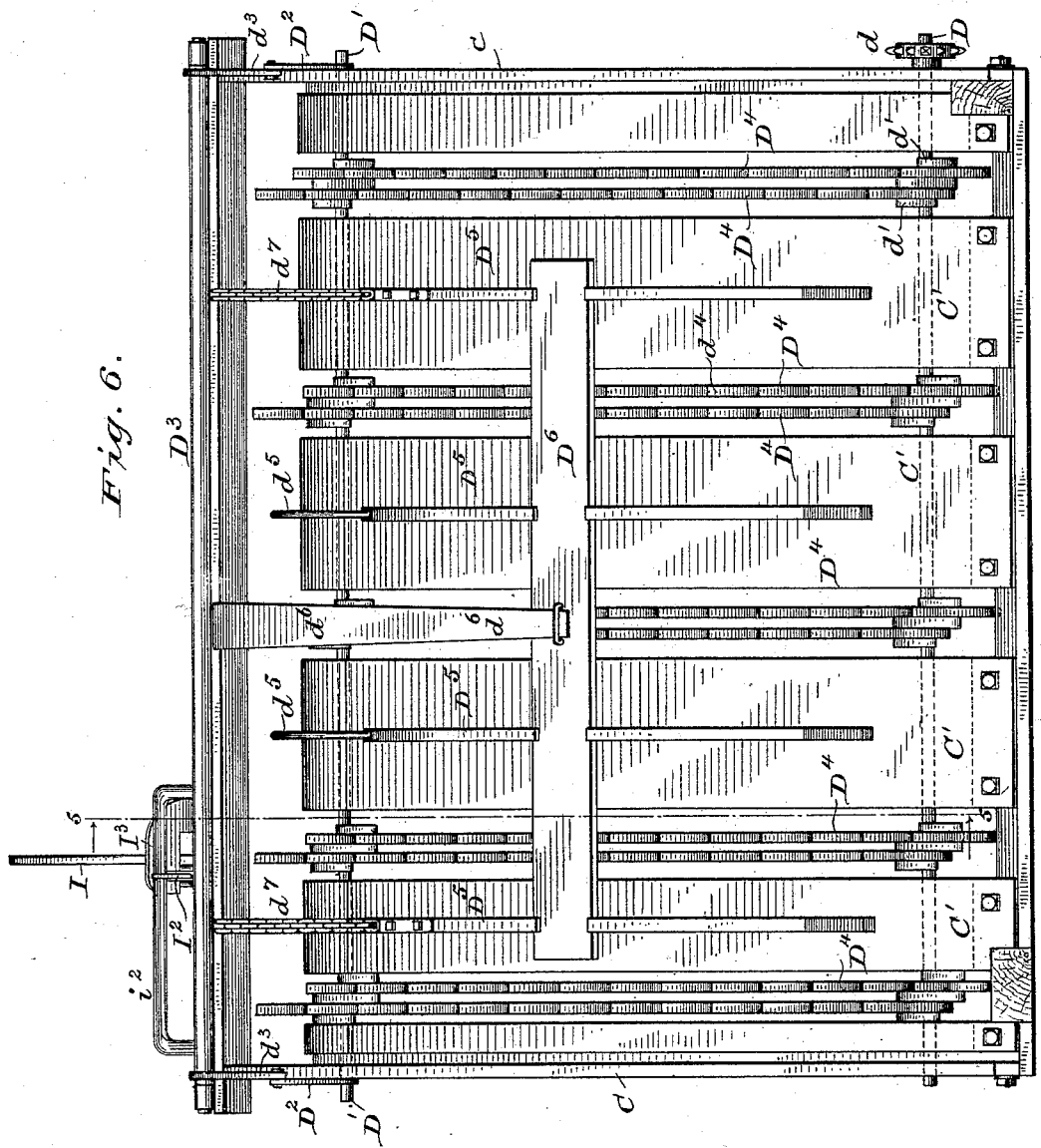
Witnesses
Wm A. Skinkle
Henry A. Lamb
Inventor
Charles B Withington
By his Attorneys (No Model.) 7 Sheets—Sheet 6.
C. B. WITHINGTON.
GRAIN BINDER.
No. 422,103. Patented Feb. 25, 1890.
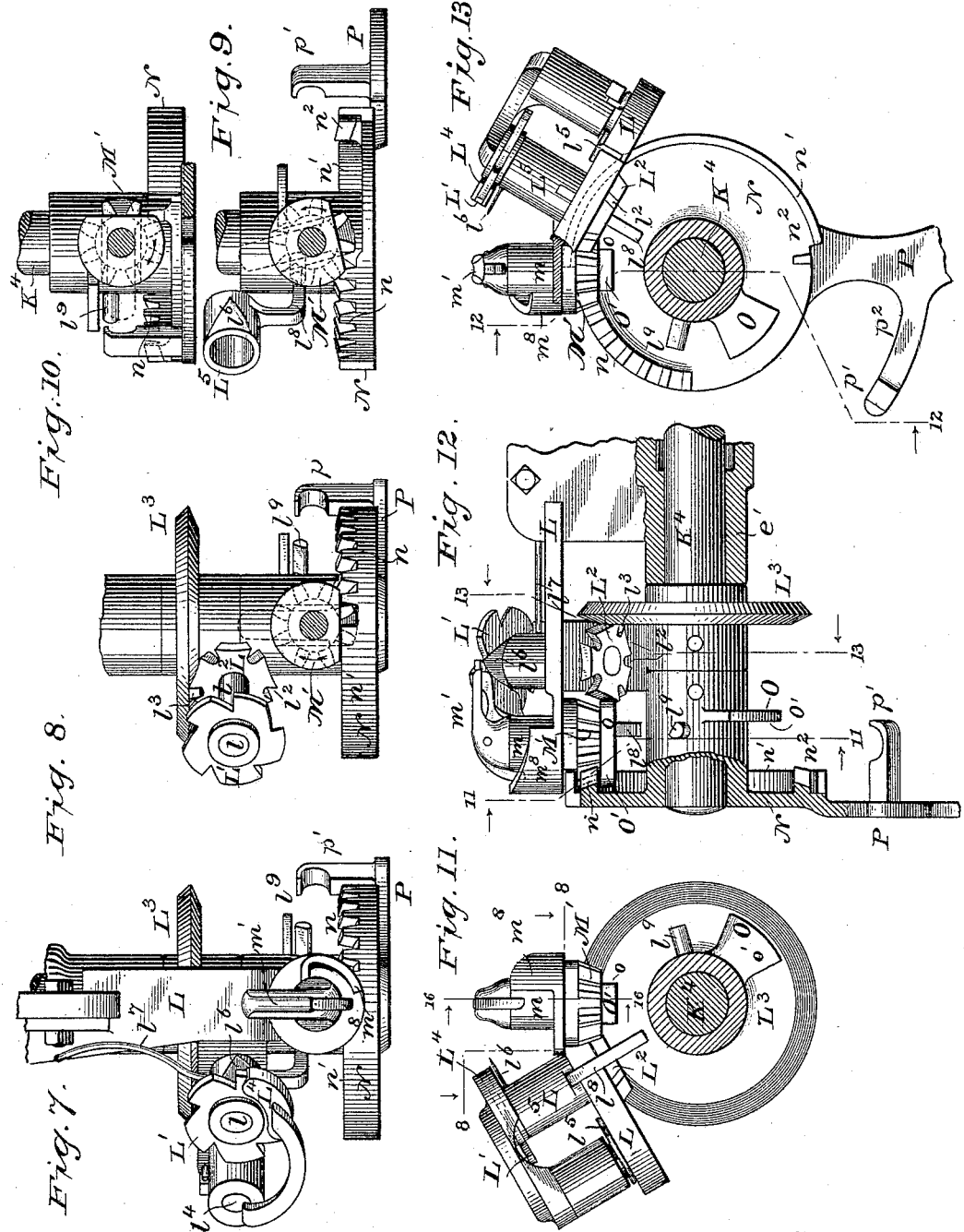
Witnesses
Wm A. Skinkle
Henry A. Lamb
Inventor
Charles B. Withington.
By his Attorney
Parkinson & Parkinson (No Model.) 7 Sheets—Sheet 7.
C. B. WITHINGTON.
GRAIN BINDER.
No. 422,103. Patented Feb. 25, 1890.
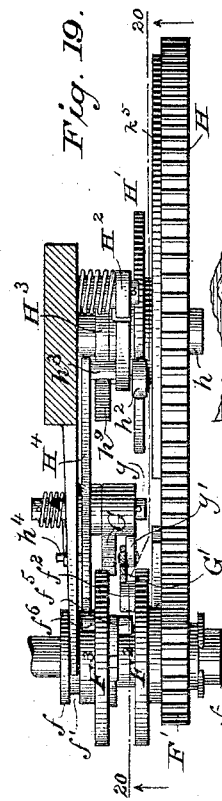
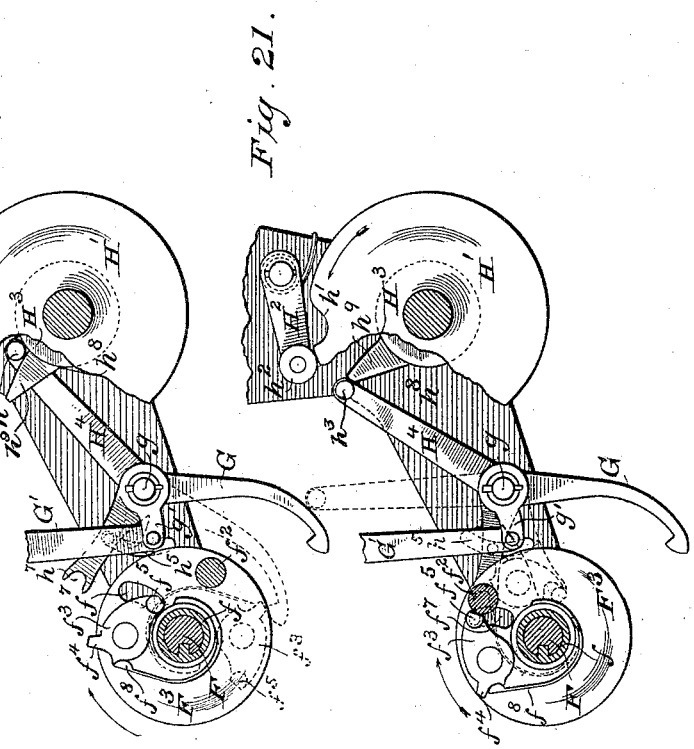
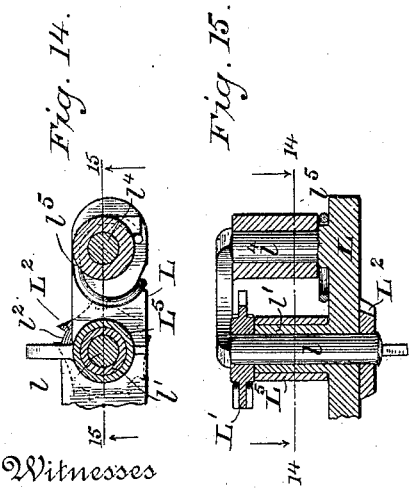
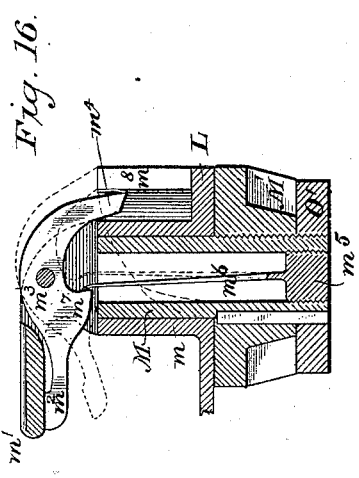
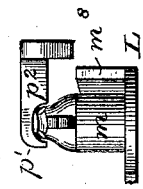
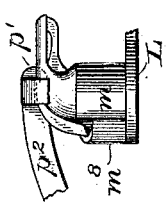
Witnesses
Wm A. Skinkle
Henry A. Lamb
Inventor
Charles B Withington
By his Attorneys

UNITED STATES PATENT OFFICE.

CHARLES B. WITHINGTON, OF JANESVILLE, WISCONSIN.

GRAIN-BINDER.

SPECIFICATION forming part of Letters Patent No. 422,103, dated February 25, 1890.

Application filed February 28, 1887. Serial No. 229,034. (No model.)

*To all whom it may concern:*

Be it known that I, CHARLES B. WITHINGTON, a citizen of the United States, residing at Janesville, in the county of Rock and State of Wisconsin, have invented certain new and useful Improvements in Grain-Binders, of which the following is a specification.

The modern grain-binder as used in the field, involves a carrier or other delivery apparatus to convey the grain to the binding receptacle, a trip to start the binding apparatus proper when the gavels are to be automatically sized, a binder-arm to carry the band around the gavel and bring its ends together, a compressor closing the outer or exit side of the receptacle and acting in opposition to the binder-arm, a cord-holder in which one or both ends of the bands are grasped preparatory to the tying operation, a knotter by which said ends are usually united in a hard knot, and a cutter severing the ends between the knotter and the holder after the knot has been formed, but before it is completely tightened, usually a stripper to push the loop of the knot off of the tying devices, and, finally, the ejector, which forcibly expels the bound sheaf from the machine, wrenching the knot from the tying-jaws in such action.

My present invention relates to improvements upon the several devices, both as regards each individually and also as affects their general relation in the machine.

It also relates to improvements upon the driving-gear and the methods of communicating motion to the various parts recited.

To briefly enumerate the features of the invention, the delivery device, of which in the present instance the elevator-carrier is made the exponent, is caused to sink at its head or the end nearest the grain-receptacle beneath the decking while the binding mechanism is in action, in order to stop the delivery of the grain to said receptacle and allow it to accumulate in the uncramped and undiminished passage adjacent to the point of sinkage, and the grain in such passage is pressed upon by a spring-pressed float having spurs or shoulders near the upper end, which act to prevent its recession while the rake is out of action or sunk beneath the decking. The grain as it is conveyed by the carrier impinges against a tripping-lever, which is connected with clutch mechanism resembling that described in an application for Letters Patent of the United States filed by me on the 15th day of March, 1883, Serial No. 88,304, but containing specific improvements thereon, which will be fully explained hereinafter. The binder-arm shaft instead of being solid is bored axially to form a sleeve-bearing for a compressor-shaft, and the two are oscillated to vibrate their respective arms by means of pitmen, the former from the main gear of the binder and the latter from an intermeshing pinion provided with a delay-shoe, whereby the compressor is normally held in position to stop the exit of the grain from the receptacle, but when it starts after the descent of the binder-arm is first carried theretoward to further compress the gavel and give slack in the cord for the knotting operation, and then is carried up rapidly to open the delivery side of the receptacle and finally returned to its position of rest as the binder-arm reaches its highest point. The knotter resembles the usual tying-bill, but is given a full revolution, toward the end of which a heel projection from its pivoted jaw rides up a cam on the supporting-stock, thereby opening said jaw, and immediately at the termination of the full revolution is carried reversely a quarter of a revolution, during which such heel projection passes inside said cam, positively closing the jaw and holding it closed, so that instead of relying entirely upon spring-pressure for the closing movement as heretofore every effective movement of this jaw is positively controlled. At the end of the revolving subtending shaft that drives the knotter is fixed an arm, which, in the revolution of said shaft and immediately after the knotter comes to rest at the end of its reverse movement with its jaws pointing outwardly, passes through a slot in the decking and sweeps the receptacle from the inner to the outer side, thereby ejecting the bound sheaf, and upon this arm or a forwardly-projecting finger therefrom is a lateral offset, cupped or hollowed to fit over the crown of the knotter and brush it from the heel to the nose as the ejector passes, so as to push the loop down upon the crossed ends and complete the knot. A disk-holder similar to that heretofore employed works in conjunction with this knotter and is driven by a Swiss stop, the number of interdental spaces in which corresponds to the number of notches in the disk, and which is revolved by a single tooth on the face of a disk affixed to the driving-shaft and provided with a suitable delay surface or ledge to engage with the successive delay-shoes, and a knife mounted at the end of a short rock-shaft and held in retracted position by a spring is vibrated at the proper time by a pin upon a driving-shaft striking a hanger or tail-piece from said rock-shaft.

In the drawings, Figure 1 is a top plan view of a binding attachment and so much of a harvester-elevator embodying my invention as is necessary to an understanding thereof. Fig. 2 is an elevation from the stubble side of said attachment, showing also the head of the elevator; Fig. 3, a rear elevation with parts broken away to more clearly expose the driving-gear of the binder; and Fig. $3^a$, Sheet 4, a detail elevation of the main gear and stop-motion pinion, shown in said latter figure on the reverse side thereof; Fig. 4, a like elevation from the front with the elevator omitted. Fig. 5 is a vertical longitudinal section through the machine on the correspondingly-numbered line in the succeeding figures. Fig. 6, an elevation from the grain side of the feeding or carrying devices, here shown as mounted in the elevator and constituting its lifting or carrying mechanism; Fig. 7, a top plan view of the knotter head and holder, showing also part of the cutter and the ejector and stripper-arm and immediate driving mechanism for these devices, and, like all of the succeeding figures, on an enlarged scale; Figs. 8, 9, and 10, details of the driving devices just alluded to and of the supporting-stock; Fig. 11, a sectional elevation seen from the front of the machine, as indicated by a correspondingly-numbered line and arrows in the next figure of the knotter holder and cutter, with the wheel for driving the holder and the pin for operating the cutter; and Fig. 12 an elevation from the inner or grain side of the knotting, holding, and cutting head and devices for driving the parts thereof and of the ejector and stripper, partly in section; Fig. 13, an elevation from the rear of the machine of the parts just referred to, omitting the wheel for driving the holder; Figs. 14 and 15, sectional details of the holder on the lines mutually indicated by corresponding figures; Fig. 16, a vertical section through the knotter and its supporting-stock and driving-pinion; Figs. 17 and 18, details to illustrate the action of the stripper; and Figs. 19, 20, and 21, details in elevation of the tripping-clutch and its controlling devices.

A represents the sills of the harvester-frame; B, the cross timbers or girts connecting these sills beneath the elevator and forming the lateral timbers of the wheel-frame in a harvester of this construction, and C the elevator-struts, the outer pair of which are connected by a rail $c$ at a sufficient height to receive the hooks or keepers beneath the inner edge of the binding-table and afford the upper support for the binder attachment, and also by a second rail $c'$ near the apex, which latter rail supports one end of the slats $C'$, forming the floor of the elevator, the other end of said slats being secured to a rail at the foot of the inner struts.

As one feature of my invention requires that the upper end of the elevator-carrier shall sink below the decking at certain times, it is not feasible to use an endless apron upon the surface of which the grain rests; but a rake must be employed teeth from which project between the slats which form the flooring and upon which the grain rests and sweep longitudinally in the interslatal spaces. Of such rakes there are a number of different forms, among them endless chains mounted on through-shafts at the foot and head of the elevator, which bring their upper ply within or nearly within the spaces or slots and about flush with the surface of the decking, and having teeth which project up above such surface, or else chains or belts at front and one at rear likewise supported at the head and foot upon shafts and carrying a series of cross-bars or rake-heads having teeth properly-spaced to pass between the slots, so that the latter will be swept thereby as the chains are moved by the rotation of their driving-shaft. In still another form the shafts at the head and foot of the elevator are cranked and receive upon these cranks the ends of a series of bars provided with forwardly-set teeth, which by the revolution of the cranks are alternately raised above and carried along the space between the slats and then sink beneath and return to take a fresh start.

As my improvement requires a shaft at the head of the elevator or delivery end of the carrier, and as all three of these forms require such a shaft, it will suffice to select the latter as an exponent in describing this particular feature. At the foot of the elevator is a shaft D, turning in fixed bearing-boxes in the front and rear elevator-struts or upon the sills, driven by the chain-wheel $d$, or any equivalent pulley or spur wheel, and having beneath each slot or way in the elevator-flooring double cranks $d'$, reversely placed, while at the head of the elevator is a similar shaft $D'$, also having double cranks reversely placed; but instead of turning in fixed bearings this latter shaft passes through slots $d^2$ in the struts, which serve to guide it in a rising-and-falling movement, and is sustained by links $D^2$, suspended from crank-arms $d^3$, outset from a rock-shaft $D^3$, supported upon the ridge-plank over the passage-way for the grain, so that whenever this latter shaft is rocked it will either sink the upper elevator-shaft or lift it. The cranks of the two elevator-shafts receive upon them bars D⁴, having forwardly-set teeth d⁴, a pair of bars being set side by side upon each pair of the cranks, and therefore working in the same slot in the decking. Thus when the shaft at the foot of the elevator is revolved in the proper direction the tooth-bars will be caused to walk and rake the grain toward the head.

In order to retain the straw in contact with this carrier or with any carrier used as a substitute for it, a float or presser is employed, consisting of a series of bars or runners D⁵, having at their upper ends curved rods or deflectors d⁵, starting somewhat above their inner or contact edges, so as to leave upwardly-projecting shoulders or spurs d^× at the extreme upper end of the runners, whereby the grain may be caught and prevented from return down the elevator. These rods are sufficiently raised above the decking at the head of the elevator to allow the accumulation of grain beneath them beyond said shoulders when the upper end of the rake is out of contact with such grain. The runners are retained at fixed distances apart and made to act bodily by means of a cross-board D⁶, upon which a spring d⁶ from the ridge-plank presses. Chains d⁷ or other flexible connections support this float, presser, or wind-guard from the ridge-plank, and allow it to rise and fall and adapt itself to the exigencies of the material passing beneath. As thus constructed, it is evident that whenever the delivery of the grain at the head of the elevator is to be cut off this may be done by lowering the head-shaft carrying the rake-bars beneath the flooring at that point and adjacent thereto, and that when the delivery of the grain is to be resumed the head-shaft will be elevated through the medium of its supporting rock-shaft, which may be oscillated by any suitable means or connection, but is herein shown as actuated by link-connection with a spur from the heel of the binder-arm, as will presently be described. Such raising and lowering do not in any way cramp or infringe upon the passage-way for the grain nor interfere with the limit to which the float can yield from the decking, as would be the case were the decking itself lifted above the rake-bars to cut off the grain or moved down toward them to re-establish its delivery.

The binding mechanism is carried upon a post-frame E, having an arm e overhanging the grain-receptacle and another arm e' subtending the same, and beneath the latter and partly in line with the post a depending bar or hanger e², terminating in an insetting arm, for a purpose presently explained. From the subtending arm bar or braces E' extend inward toward the elevator and hook over a metal way e³, bolted to one of the before-mentioned cross-rails connecting the outer elevator-struts. Other bars or legs E² extend diagonally downward and inward to the outer lateral timber of the wheel-frame or end sill of the harvester-frame, and are provided with feet which engage with ways e⁴, mounted upon such sill, thus enabling the binder attachment to be readily applied and detached and to be adjusted along the end of the elevator, that the band may be placed around the center of the gavel, notwithstanding the varying length of the grain. Upon the frame is placed the binding-table E³, with its chute e⁵ extending from the head of the elevator over the subtending arm of the frame, and just above it, a suitable distance to support the grain and to protect the band-uniting mechanism.

In bearings on one of the transverse sills or bars at the foot of the outer elevator-struts is mounted a shaft F, constantly driven by suitable connection with the harvester-gearing and carrying a sleeve f, which is feathered or splined to the shaft and receives in a circumferential groove f' a yoke from the insetting arm of the down-hanger e², so that whenever the binder is adjusted along the end of the harvester this sleeve may accompany the adjustment, but at the same time partake of the rotations of the shaft. A loose pinion F', hereinafter termed the "driving-pinion," turns upon a suitable journal afforded by the sleeve, and has formed integral with itself a disk F², from which projects a lateral driving-pin f² on the face away from the pinion. Alongside of this disk and pin is a second disk F³, of about the same size, but made fast to or integral with the sleeve, so as to revolve therewith. Upon this latter or driving disk is pivoted a dog f³, having at its heel a spur f⁴ and at its nose an offset f⁵, which latter projects sufficiently to come in contact with the pin upon the loose disk when the dog is swung into the proper position. Another pin f⁶ projects from the opposite side of the nose through a curved slot f⁷ in the driving-disk, thus limiting the play of the dog and affording means for its disengagement, as will presently appear, and a spring f⁸ presses against the doubly-recessed heel of the dog, so that it may hold it in position at each extreme of the movement permitted by the slot. From the insetting arm of the down-hanger e² projects a pivot-pin g, upon which is mounted a trip latch or stop G, hooked at its end and having a crank-arm g' from its hub, to which is pinned a link G', rising to a connection with a wrist-pin on a crank-arm g² from a rock-shaft G², oscillating in bearings afforded by bars or brackets G³, which extend inward from the overhanging arm of the post-frame and rest upon the ridge-plank of the elevator, but are not attached thereto in any manner that will interfere with the adjustment of the binder. From the inner end of this rock-shaft depends a lever g³, which normally touches or nearly touches the grain-table adjacent to the slot for the play of the binder-arm and cuts off the flow of grain delivered from the elevator. As the grain accumulates, this lever rises, rocking the shaft and drawing upon the link, which may be slotted for a short distance lengthwise to permit some play of the wrist-pin before it is affected. The movement of the link raises the trip-stop until finally it comes in the path of the spur from the heel of the driving-dog and catches thereover, rocking the dog and bringing its nose up so as to throw the driving-lug into engagement with the pin upon the loose disk and start the driving-pinion.

Constantly engaging with the driving-pinion and driven by it whenever it is tripped or started is the main gear H of the binder, journaled upon a shaft $h$, secured to the subtending arm of the post-frame and projecting outside of the down-hanger $e^2$. Upon the inner hub of the gear is a disk H′, having a peripheral notch $h'$, and pivoted to the down-hanger $e^2$ is a spring-pressed brake-arm H², carrying an offsetting pin or anti-friction roller $h^2$, which travels upon the periphery of the disk, and at the moment that the gear comes to rest sinks into the notch to lock said gear and the binding mechanism driven thereby against retrograde movement, the proper side of the notch being of course placed at a sufficient inclination to allow the roller to ride up and reach the main periphery whenever the disk is driven forward, and the opposite side of said notch being of such outline as to bar escape in that direction and thus prevent backlash. Inside of the disk is a cam H³, also fixed to the hub of the main gear, or else pinned to the shaft which carries and is turned by said gear and traversed by a pin $h^3$ upon the heel end of an elbow-lever or disengaging-stop H⁴, pivoted upon the axis of the tripping-stop. A pin $h^4$ from the effective arm of this lever passes through a curved slot $h^5$ in the adjacent down-hanger $e^2$, which serves to limit its play, and is pressed upon by a spring $h^6$, acting to hold the heel end of the lever normally in contact with the cam. At its nose it is slightly recessed or formed with a seat $h^7$ to receive the disengaging-pin of the driving-dog. From the outset of the revolution of the main gear the heel of the disengaging-stop is in contact with the inner or concentric reach $h^8$ of the cam, causing the nose to be thrown up or out, as indicated in Fig. 20, away from the path of the driving-dog; but just before the termination of a full revolution of the gear, corresponding to one entire binding operation, it is struck by the projecting reach $h^9$ and lifted, swinging the nose down to the position denoted by full lines in the succeeding figure, where it receives the disengaging-pin as the driving-disk comes around, and, being swung further by the onward movement of said pin, presses it in toward the hub of the disk, releasing the driving-dog from the driving-pin and thereby unclutching the pinion, and finally restoring it to its idle position, as represented in dotted lines, when the disengaging-lever goes back to its original position and awaits the next action of the binding mechanism.

The binder-arm I resembles those in common use—that is, it is formed with a concentric guard or fender $i$, which serves to cut off and separate the incoming grain from the gavel around which the arm carries the band material; but, unlike those referred to, it is so arranged that this fender in the binding movement is carried close to the head of the elevator to cut off the delivery therefrom, so that the stream is dammed up and collects in and along the elevator itself. From the heel of the arm, beyond the rock-shaft I′, to which it is secured and which turns in bearings in the overhung arm of the post-frame, projects a spur $i'$, and a link I², pivoted to this spur, hooks over a stirrup-arm $i^2$ upon the rock-shaft above the head of the elevator and from which the head-shaft of the carrier is suspended, thus holding the upper end of the carrier in its effective position when the binder-arm is at rest at the extreme of its upward vibration, permitting said upper end to sink beneath the elevator-flooring as the arm descends to encircle a gavel, and again lifting it to its work when the arm rises. The link passes through a guide-bracket I³ from the binder-frame, and is thereby held in proper alignment in order that as the binder is adjusted back and forth it may slide along the stirrup without cramping, and always be in position to actuate the supporting-shaft of the carrier.

At the outer end of the binder-arm shaft is a crank $i^3$, from which a pitman I⁴ extends to a wrist-pin $i^4$ upon the main gear, whereby the shaft is rocked once in each direction with every full revolution of the gear, carrying the binder-arm down to place the band and lifting it again to its position of rest.

The binder-arm shaft I′ is bored axially to receive and form a bearing for another shaft K, which at its inner end above the binding-receptacle passes loosely through the hub $k$ of a compressor K′, that is urged forward toward the binder-arm and normally held against a suitable stop-pin on the shaft by means of a coiled spring $k'$, but in the reverse direction is permitted to yield against said spring to accommodate itself to the gavel. A crank $k^2$ at the other or outer end of the compressor-shaft connects by pitman K² with a wrist-pin $k^3$ on a stop-pinion K³, meshing with and driven by the main gear, but thrown into motion therefrom in the same way as usual in stop-motion gears. Said pinion has a shoe $k^4$, which rides upon a delay-ledge $k^5$, projecting from the inner edge of the main gear and is so situated relatively to the wrist-pin that while the pinion is locked and the binder at rest with the binder-arm elevated, and in the ensuing movement so long as its shoe is engaged with and traveling upon the ledge, which is concurrent with the descent of the binder-arm, the compressor is down, closing the exit from the binding-receptacle; but after the shoe leaves the ledge and the pinion begins to revolve the wrist-pin has yet a short distance to travel to reach and pass its dead-center, thus carrying the compressor suddenly inward to still further compact the gavel during the action of the band-uniting devices; then as the dead-center is passed opening it rapidly to permit the ejection of the bound sheaf, after which it is returned to its starting-point, and the shoe again engages with the ledge to hold it there.

From the forward end of the subtending arm $e$ of the frame projects a bracket or stock L, which overhangs the exposed end of the main shaft journaled in said arm and affords a support for the holder, knotter, and cutter. The holder is composed of the ordinary notched disk L', having a shoe or saddle piece and fixed to a short spindle $l$, that passes through a boss $l'$, Fig. 15, uprising from the stock and beneath receives a Swiss stop-motion $L^2$, which has as many interdental spaces $l^2$ as there are notches in the disk, and each tooth of which forms a delay-shoe. Pinned to the main shaft alongside this pinion is a wheel $L^3$, having a single tooth $l^3$, to engage with the pinion and move the disk one notch for each full revolution of the main shaft, while the face of the disk, except at the single point where its tooth projects, forms a delay-surface, with which each shoe successively engages to lock the holder-disk in fixed position in the intervals between the binding operations. The shoe or saddle piece $L^4$, supported upon a pivot-pin $l^4$ from the stock and pressed by a spring $l^5$, embraces the periphery of the disk at such point that the cord carried forward at each intermittent movement may be clamped between the two and firmly held. Embracing the boss in which the holder-spindle is mounted is a sleeve $L^5$, carrying a knife $l^6$ at its upper end, immediately beneath the disk, and held back to keep the knife out of effective position by means of a spring $l^7$, while a tail-piece $l^8$ depends from the base of the sleeve into the path of a pin $l^9$, projecting from the main shaft or from a hub fixed thereto, so that at the proper moment the pin will strike the tail-piece, bringing the knife against the cord clamped between the disk and its saddle-piece and sever the strands.

The knotter or tying-bill which I employ much resembles that now in use, but differs in some particulars. It is mounted at the head of a hollow spindle M, turning in a boss $m$ upon the stock and receiving at its lower end a beveled pinion M'; which has the usual delay-shoe. The upper end of the spindle is prolonged into or has fixed to it the rigid knotter-jaw $m'$, slotted through its neck to admit the shank of a second jaw $m^2$, secured by a pivot-pin $m^3$, passing through the first, and the heel $m^4$ of the pivoted jaw is prolonged and bent downward past the neck and a little distance along the boss. From a screw-plug $m^5$, closing the lower end of the hollow spindle, rises a plate-spring $m^6$, which presses against a shoulder $m^7$ on the pivoted jaw to hold it normally closed, and rising from the stock outside of the bearing-boss is an inclined cam $m^8$, the inner wall of which is set out somewhat from the boss sufficiently to admit the heel of the pivoted jaw.

A wheel N, formed with a face-segment $n$ of sufficient length to give the knotter-pinion one complete revolution, is secured to the main shaft so as to engage with said pinion, and a delay-ledge $n'$ projects from this wheel to hold the knotter stationary until the segment and pinion intermesh, but is cut away for a distance behind the rear end of the segment to permit a reverse movement to be given to the knotter after an entire revolution has been completed, and then a second onward movement to return it to the terminal point of its revolution, for which latter purpose a single tooth $n^2$ stands by itself just in advance of the ledge. When the knotter is at rest with its shoe upon the delay-ledge, its position is as indicated in Fig. 7, with its jaws parallel with the main shaft, or nearly parallel, so as to intercept the cord laid by the binder-arm and receive it under its chin. As it starts, however, it revolves in a direction that brings the heel-piece of its pivoted jaw at the end of about three-quarters of a revolution against the cam on the stock, and in its continuing movement this heel-piece is forced out as it ascends the cam, opening the jaw to receive the cord ends. Finally, just as the full revolution is completed, the heel-piece passes off of the cam and the jaw is snapped shut upon the crossed ends of the cord by means of the inclosed spring. The spring, however, is not expected to give force enough to hold the strands against the strain that will be immediately brought upon them, and therefore it is desirable that for a time the jaw shall be held positively closed. This is the purpose of the reverse movement, which is now caused as the delay-shoe has reached the cut-away portion of the driving-wheel by the flange O on the hub of said wheel or from the main shaft striking the cross-head O', fixed to the knotter-spindle below the pinion and reversing said knotter a quarter of a revolution, carrying the heel-piece inside the cam, whereby it is held positively closed with its jaw. The cross-head has a straight edge $o$, which temporarily engages with the face $o'$ of the actuating-flange, and serves as a delay-shoe to hold the knotter fixed in the position it has now assumed—that is, with its jaws pointing outward at right angles to the main shaft, or in the direct line in which the bound sheaf is to be ejected.

Projecting rigidly from the main shaft, and in the present instance formed integral with the wheel which actuates the knotter-pinion, is an ejector-arm P, that immediately after the knotter has assumed its last-mentioned position rises through a slot $p$ in the decking near the center and traverses the receptacle from the inner to the outer side to force the sheaf away and wrench the knot from the tying-bill. In order to push the loop from the jaws of the bill before the ejector acts with appreciable force upon the sheaf, a stripper $p'$ is carried thereby either upon the shank, if that is of a suitable shape, or else upon a forwardly-projecting arm $p^2$, to which it forms a lateral offset. This offset is cupped or recessed beneath to just fit over the crown of the knotter, and since at the moment the knotter is pointing directly outward it will sweep it or brush it closely from the heel to the nose, carrying the loop off upon the ends held between the jaws, and thus perfecting the knot. This having been done and the ends severed by the knife, which is at this instant moved, the ejector carries the sheaf from the machine, and immediately the knotter-pinion is struck by the solitary tooth upon its driving-wheel, which turns it sufficiently to bring the delay-shoe in contact with the forward shoulder of the delay-ledge, and thus completes the turn, carrying the knotter to its original position, in which it is thereafter held until called upon to tie the next band.

I claim—

1. The combination, substantially as hereinbefore set forth, with the grain-receptacle and automatic binding mechanism, of the elevating-rake and means whereby it is depressed at the upper end beneath the decking during the binding operation, and a spring-pressed float having spurs or shoulders near the upper end which act to prevent the recession of grain when the rake is out of action.

2. The combination, substantially as hereinbefore set forth, with a grain-receptacle, automatic binding mechanism working in connection therewith, elevator-rake, and means whereby said rake may be depressed beneath the decking at its upper end to intermit the delivery of grain, of the elevator-float composed of runners having spurs or shoulders at the upper end to prevent the recession of grain, and above these curved rods or deflectors, which are raised away from the decking to give space for the accumulation of such grain beneath them.

3. The combination, substantially as hereinbefore set forth, of the elevator, its rake, the rock-shaft from which the upper end of said rake is supported, the bridle-lever on said rock-shaft, the binding mechanism adjustable with its receptacle along the end of the elevator, the link from the binder-arm connected with said bridle-lever, and the guard through which said link passes supported from the binder-arm, whereby the link is carried along the bridle-lever when the binder is adjusted.

4. The combination, substantially as hereinbefore set forth, with the rock-shaft from which the delivery end of the elevator-rake is supported and its bridle-piece, of the binder-arm and the hooked link from said binder-arm entering the bridle-piece, whereby the elevator-rake will be raised as the binder-arm rises and allowed to descend or fall when the binder-arm descends and during a portion of said descent and left stationary during the remainder of the descent.

5. The combination, substantially as hereinbefore set forth, of the binder-arm adjustable along the end of the harvester, the overhung bracket supporting the binder-arm shaft, the frame-bars from said bracket resting upon and sliding along the ridge-board of the elevator, the rock-shaft at the head of the elevator, the crank-arms and links from said rock-shaft supporting the head-shaft of the elevator-rake, the bridle-lever from the rock-shaft, the hooked link connecting the heel of the binder-arm with said bridle-lever, and the guide carried by one of said frame-bars and embracing said link.

6. The combination, substantially as hereinbefore set forth, of the grain-receptacle, the elevator, the trip-lever placed over the grain-receptacle just in advance of the grain-chute, the rock-shaft to which it is fixed, the link depending from said rock-shaft, the trip-stop, the disengaging-stop, the driving-dog, the gear-train connecting with the binder, and the cam on the main gear-shaft.

7. The combination, substantially as hereinbefore set forth, of the binder-arm, its hollow shaft, the crank-arm from the outer end of said shaft, the compressor, its shaft passing through the binder-arm shaft and having a crank-arm at its outer end, the main gear with its delay-ledge, the pinion driven thereby and having a delay-shoe, wrist-pins on said main gear and pinion, and links connecting the wrist-pin on the main gear with the crank on the binder-arm shaft and the wrist-pin on the pinion with the crank on the compressor-shaft, whereby the compressor closes the exit from the grain-receptacle during part of the revolution of the main gear, then is moved forward against the gavel after the descent of the binder-arm, and then rapidly opened away therefrom and immediately closed to its position of rest.

8. The combination, substantially as hereinbefore set forth, of the binder-arm, its hollow shaft, a crank-arm from said shaft, the compressor, its shaft passing through the binder-arm shaft and having a crank-arm, the main gear having a delay-ledge, the tyer-shaft, the pinion on the outer end of said shaft having a delay-shoe engaging with the main gear, and also having a wrist-pin, and the links connecting the cranks on the binder-arm shaft with the wrist-pin on the main gear and the crank on the compressor-shaft with the wrist-pin on the pinion.

9. The combination, substantially as hereinbefore set forth, of the binder-arm, its hollow shaft, a crank-arm from said shaft, the compressor, its shaft passing through the binder-arm shaft and having a crank-arm, the main gear having a delay-ledge, the tyer-shaft, the pinion on the outer end of said shaft having a delay-shoe engaging with the main gear, and also having a wrist-pin, and the links connecting the crank on the binder-arm shaft with the wrist-pin on the main gear and the crank on the compressor-shaft with the wrist-pin on the pinion, and an elastically-yielding connection between the compressor and its shaft.

10. The combination, substantially as hereinbefore set forth, with the grain-receptacle, of the overhung binder-arm, the tying-bill located beneath said receptacle, the ejector-arm upon the tyer-shaft, and the stripper arranged upon said ejector-arm so as to sweep the crown of the tying-bill.

11. The combination, substantially as hereinbefore set forth, of the grain-receptacle, the tying-bill arranged below said receptacle, mechanism whereby said bill is stopped at the end of the tying operation with its jaws pointing outward, and a stripper carried upon an arm from and rigid with the revolving tyer-shaft, and arranged to sweep the crown of the bill, in the revolution of said shaft, at the end of the knotting operation.

12. The combination, substantially as hereinbefore set forth, of the tying-bill, mechanism whereby it is stopped at the conclusion of the knotting operation with its jaws pointing outward, an arm projecting rigidly from the revolving tyer-shaft, and a cupped stripper-finger projecting from said arm so as to be carried along the crown of the knotter in the continued revolution of said tyer-shaft and closely embracing it, to strip the loop therefrom.

13. The combination, substantially as hereinbefore set forth, of the tying-bill, mechanism whereby it is stopped at the conclusion of the knotting operation with its jaws pointing outward, an ejector-arm carried by the tyer-shaft, and a laterally-projecting finger from said ejector-arm, arranged to strip the crown of the knotter in the continued revolution of the tyer-shaft after the knotting operation ceases and immediately in advance of the ejection of the sheaf.

14. The combination, substantially as hereinbefore set forth, of the tying-bill, the spring acting to close its pivoted jaw, the pinion fixed to the end of the tyer-spindle, the delay-shoe between said pinion and the tying-jaws, a wheel having a face-segment and delay-ledge engaging with said pinion and shoe to lock the tyer normally in position with its jaws across the line of the cord-slot and to give it a full revolution from said position, a delay-shoe fixed to the tyer-spindle beneath the pinion, and a wing or delay-plate from the tyer-shaft by which said shoe is struck at the conclusion of the full revolution to reverse the spindle a quarter of a revolution and lock it temporarily in position with its jaws pointing out along the slot.

15. The combination, substantially as hereinbefore set forth, of the hollow tyer-spindle, the rigid jaw fixed to the top of said spindle, the pivoted jaw carried thereby and having the shoulder immediately over the bore of the spindle, the screw-plug closing the farther end of the spindle, and the leaf-spring integral with and rising from said screw-plug and pressing against the shoulder of the pivoted jaw.

16. The combination, substantially as hereinbefore set forth, of the holder-disk, its spindle and stop-pinion, the delay-wheel with which said pinion engages, the sleeve embracing said spindle, the knife projecting from said sleeve, the spring holding said knife back, the hanger from the sleeve, and the pin upon the tyer-shaft, whereby said hanger is struck to oscillate the sleeve and cause the knife to sever the cord-strands.

CHAS. B. WITHINGTON.

Witnesses:
A. S. WELLS,
L. VASSALL.